(12) United States Patent  (10) Patent No.: US 8,901,757 B2
Kouns  (45) Date of Patent: Dec. 2, 2014

(54) SYSTEM AND METHOD FOR CONVERTING A GAS PRODUCT DERIVED FROM ELECTROLYSIS TO ELECTRICITY

(76) Inventor: George Samuel Kouns, Uriah, AL (US)

( * ) Notice: Subject to any disclaimer, the term of this patent is extended or adjusted under 35 U.S.C. 154(b) by 167 days.

(21) Appl. No.: 13/219,420

(22) Filed: Aug. 26, 2011

(65) Prior Publication Data

US 2012/0049537 A1    Mar. 1, 2012

Related U.S. Application Data

(60) Provisional application No. 61/377,620, filed on Aug. 27, 2010.

(51) Int. Cl.
*F03D 9/00*    (2006.01)
*H02K 7/18*    (2006.01)

(52) U.S. Cl.
CPC ........................................ *H02K 7/18* (2013.01)
USPC .......................................................... 290/1 R

(58) Field of Classification Search
USPC .................................................. 290/1 A, 1 R
See application file for complete search history.

(56) References Cited

U.S. PATENT DOCUMENTS

| | | | |
|---|---|---|---|
| 3,405,290 A | 10/1968 | Hallas | |
| 3,980,033 A | 9/1976 | Frost et al. | |
| 4,014,777 A | 3/1977 | Brown | |
| 4,023,545 A | 5/1977 | Mosher et al. | |
| 4,184,931 A | 1/1980 | Inoue | |
| 4,344,831 A | 8/1982 | Weber | |
| 4,427,512 A | 1/1984 | Ham | |
| 4,936,961 A | 6/1990 | Meyer | |
| 6,761,558 B1 | 7/2004 | Kim | |
| 7,459,071 B2 | 12/2008 | Omasa | |
| 8,138,652 B2 * | 3/2012 | Davis et al. | 310/168 |
| 8,161,748 B2 * | 4/2012 | Haase | 60/618 |

FOREIGN PATENT DOCUMENTS

| | | |
|---|---|---|
| WO | 8101138 | 4/1981 |
| WO | 2009065219 | 5/2009 |

OTHER PUBLICATIONS

Article, Brown's Gas, 1998-2009 Eagle-Research, Inc.
Article, Brown's Gas, Torch Tip, 2001-2006.
Article, Water Torch, 2001-2006 Eagle-Research.
Article, Boiling Water Reactor, 2001 Eagle-Research.

* cited by examiner

*Primary Examiner* — Tho D Ta
(74) *Attorney, Agent, or Firm* — Mendelsohn, Drucker & Dunleavy, P.C.

(57) ABSTRACT

An efficient energy conversion system and method for converting a gas product produced by electrolysis into electricity. The system may include an electrolysis fuel cell, an engine and a generator. In an exemplary embodiment, the generator may be a superconducting generator and may be cooled using a refrigeration system.

20 Claims, 9 Drawing Sheets

SYSTEM AND METHOD FOR CONVERTING A GAS PRODUCT DERIVED FROM ELECTROLYSIS TO ELECTRICITY

BACKGROUND OF THE INVENTION

1. Field of the Invention

This invention relates to an energy conversion system that uses a renewable, non-polluting source of energy. Specifically, the invention is directed to a system that efficiently converts a gas product derived from electrolysis into electricity.

2. Description of the Related Technology

Different methods for separating a water molecule into hydrogen and oxygen components have been utilized in the prior art. For example, means for electrolysis is described in U.S. Pat. No. 5,089,107. Other exemplary separation processes are described in U.S. Pat. Nos. 4,344,831, 4,184,931, 4,023,545, and 3,980,033 as well as in International Patent Application publication No. WO 81/01138, published on Apr. 30, 1981.

Additionally, superconducting generators are also well known devices. For example, U.S. Pat. No. 3,405,290 discloses a superconducting generator using helium cooled stator coils.

None of these references, however, discloses engines driving generators that produce clean economical energy. Therefore, there is a need to develop an efficient system that uses a generator to efficiently convert a gas produced by electrolysis into electricity.

SUMMARY OF THE INVENTION

The invention is directed to a novel energy conversion system and method. In one aspect, the invention is directed to an energy conversion system including a fuel cell having two oppositely charged conductive plates that generate gas by electrolysis, an engine including a plurality of pistons and drive shaft, wherein the engine is driven by the generated gas, and a generator operatively associated with the engine that converts mechanical energy from the engine to electricity.

In another aspect, the invention is directed to a method for converting energy comprising the steps of: providing an energy conversion system, applying an electric charge to a dielectric medium positioned between two conductive plates of a fuel cell to generate an electric field therebetween, induce electrolysis and generate gas; using the generated gas to apply a force to and induce movement of an engine's pistons and drive shaft; and using a generator to convert mechanical energy generated by the drive shaft to electricity.

BRIEF DESCRIPTION OF THE DRAWINGS

FIG. 3(*a*) is a first section of a schematic diagram of an exemplary energy conversion system of the present invention.

FIG. 3(*b*) is a second section of a schematic diagram of an exemplary energy conversion system of the present invention complementing FIG. 3(*a*).

FIG. 5(*a*) is a perspective view of a portion of a generator showing the drive shaft, rotor, and magnetic coil elements encased in a multi-walled container having three insulating layers.

FIG. 5(*b*) is a perspective view of the generator showing the drive shaft, rotor and multiple stator assemblies including multiple magnetic coil elements.

FIG. 5(*c*) is schematic diagram of an exemplary embodiment of the system showing two superconducting generators and a plurality of magnetic rotors.

FIG. 6(*a*) is flow chart of an exemplary method of the present invention.

FIG. 6(*b*) is flow chart of an exemplary method of the present invention that incorporates a refrigeration system.

DETAILED DESCRIPTION OF THE PREFERRED EMBODIMENTS

For illustrative purposes, the principles of the present invention are described by referencing various exemplary embodiments thereof. Although certain embodiments of the invention are specifically described herein, one of ordinary skill in the art will readily recognize that the same principles are equally applicable to, and can be employed in other apparatuses and methods. Before explaining the disclosed embodiments of the present invention in detail, it is to be understood that the invention is not limited in its application to the details of any particular embodiment shown. The terminology used herein is for the purpose of description and not of limitation. Further, although certain methods are described with reference to certain steps that are presented herein in certain order, in many instances, these steps may be performed in any order as may be appreciated by one skilled in the art, and the methods are not limited to the particular arrangement of steps disclosed herein.

It must be noted that as used herein and in the appended claims, the singular forms "a", "an", and "the" include plural references unless the context clearly dictates otherwise. Thus, for example, reference to "a rotor" includes a plurality of rotor and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably.

For purposes of the present invention, "Brown's gas" is a gas comprising a mixture of hydrogen gas and oxygen gas, preferably combined in a ratio of about 2:1 that is produced by electrolysis of a dielectric liquid. In an exemplary embodiment, the Brown's gas: (1) may be non-polluting, wherein it is produced from water and reduces to vapor after combustion; (2) enables complete combustion; and (3) allows for thermal reaction, wherein the materials heated by the thermal reaction rise to a higher temperature than the flame generated when the Brown's gas is burned.

Furthermore, as used herein, "gas product" refers to any product of electrolysis, including hydrogen gas, oxygen gas, Brown's gas or mixtures thereof.

Figure 3A:
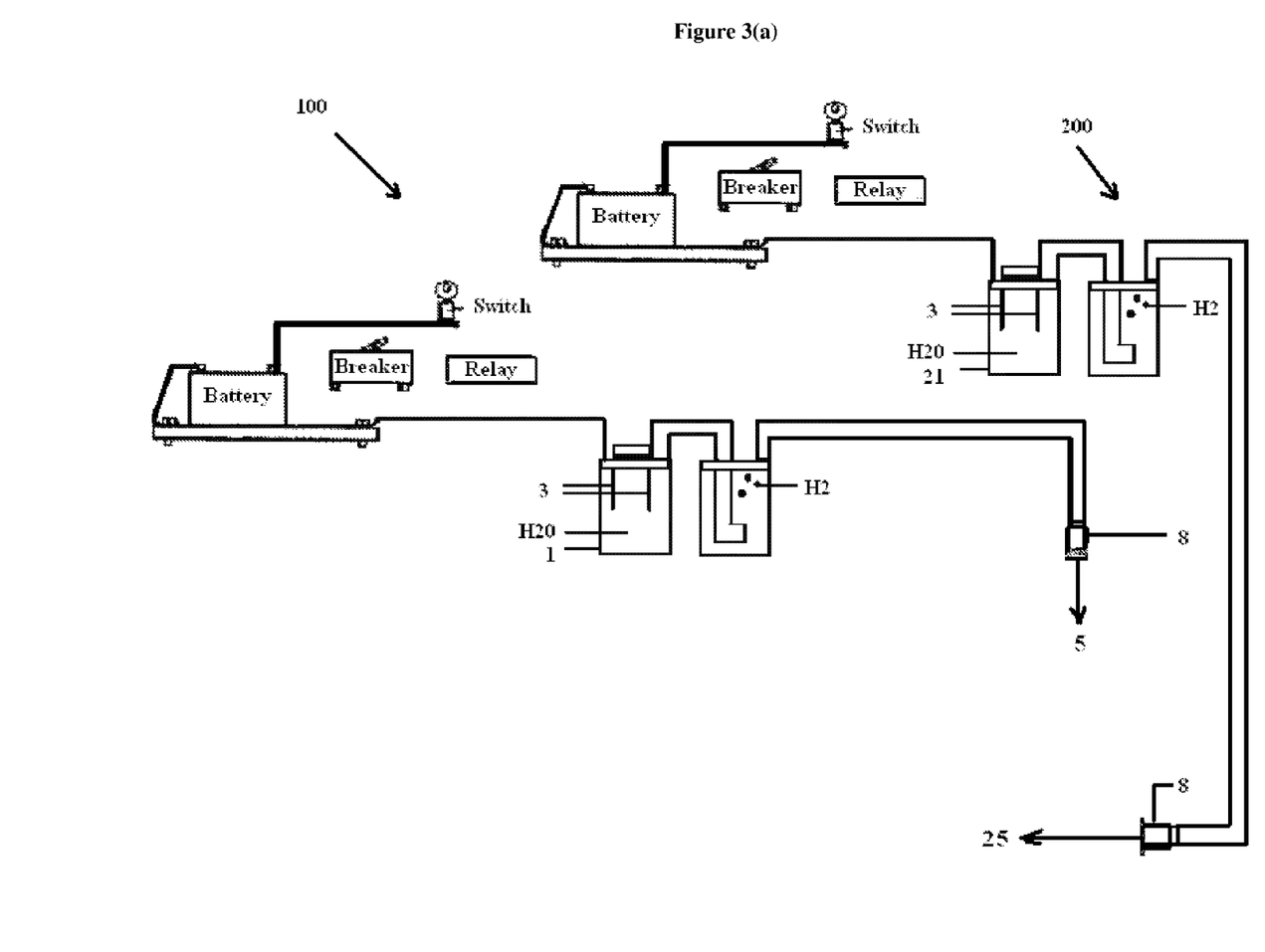
Figure 3B:
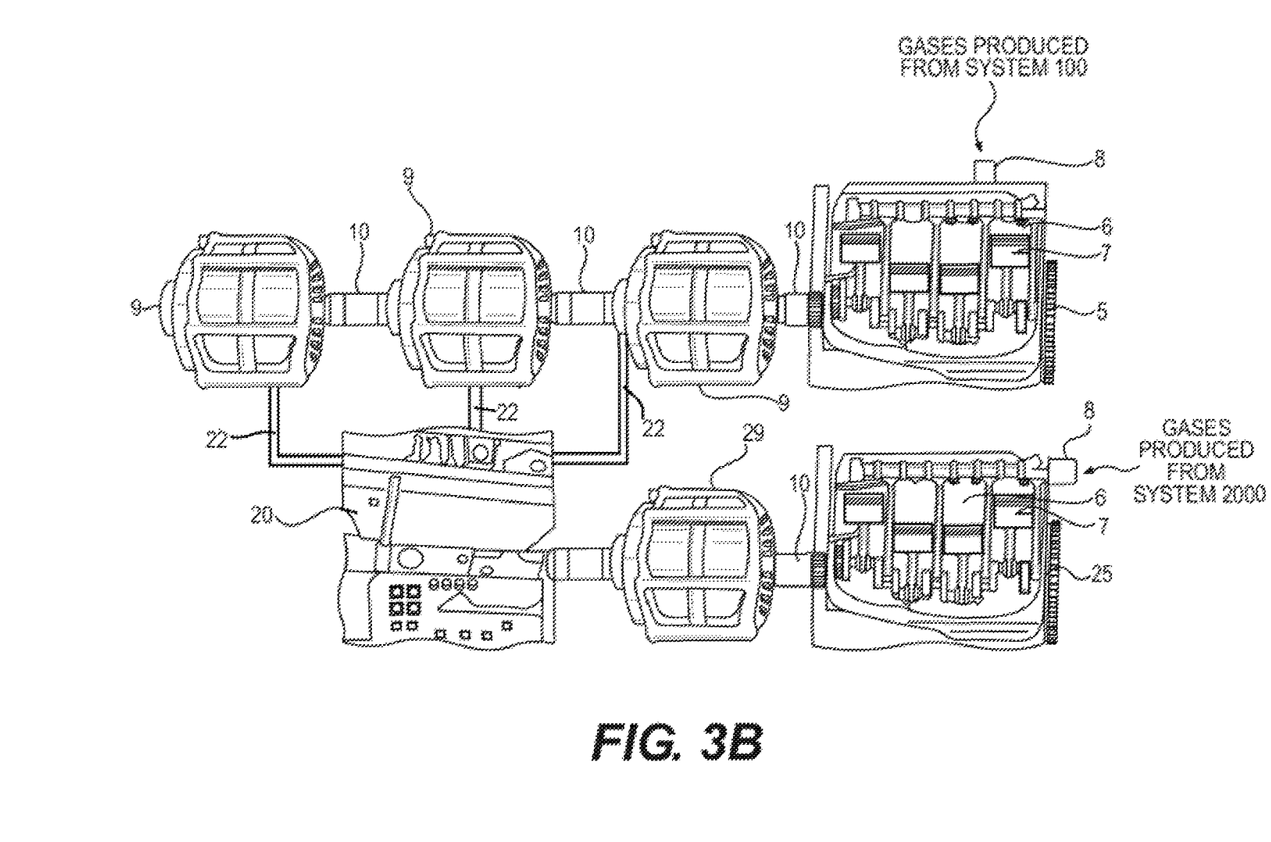

The present invention is directed to a novel energy conversion system and method for generating clean/non-polluting and renewable energy. In an exemplary embodiment, the energy conversion system 100 of the present invention, shown in FIGS. 3(*a*)-3(*b*), includes an electrolysis fuel cell 1 having at least two oppositely charged capacitor plates 3 for producing Brown's gas; an engine 5 operatively associated with fuel cell 1 that; and a generator 9 for producing electricity. In an exemplary embodiment, generator 9 may be a superconducting generator that generates electricity from magnetic induction. Additionally, energy conversion system 100 may further include a cryogenic freezing system 200 that increases electrical output by reducing or eliminating resistance encountered by the superconducting generator. The energy conversion method of the present invention involves generating a gas product by electrolysis, using the gas product to drive an engine and using a generator to convert the mechanical energy produced by the engine to electricity.

Figure 1:
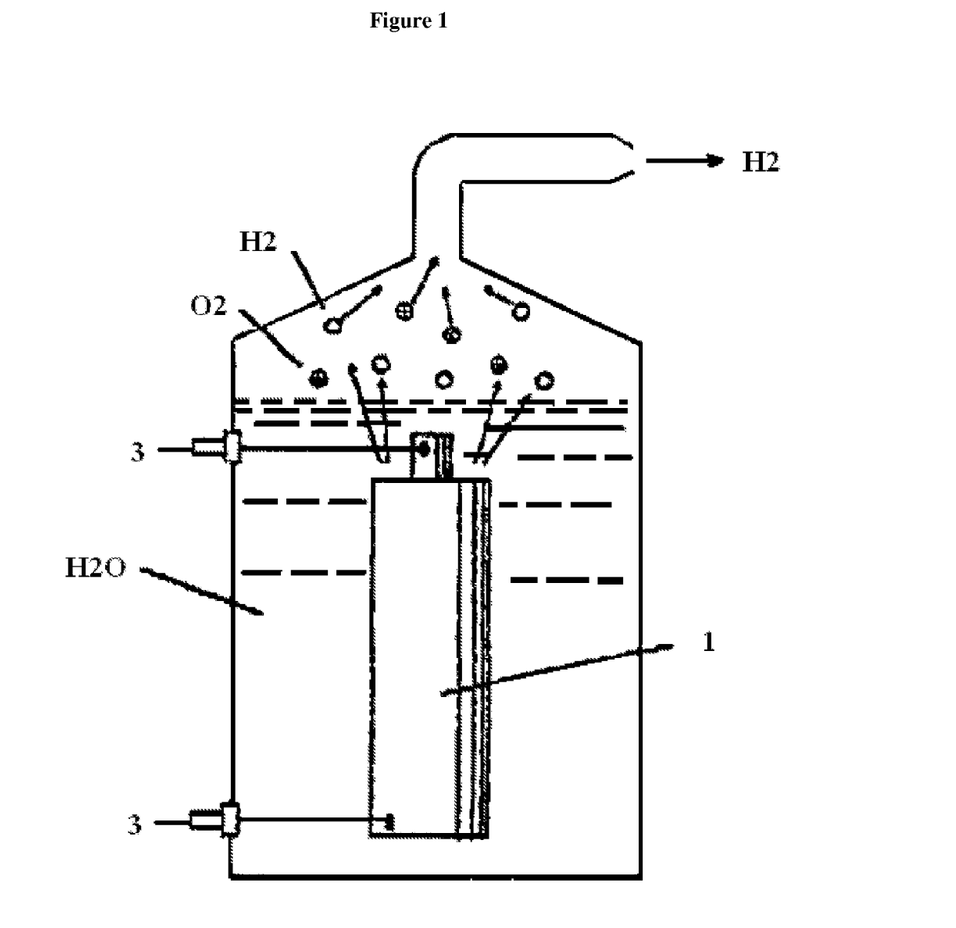
FIG. 1 is a cross-section of a fuel cell water capacitor showing two capacitor plates.

The energy conversion system 100 of the present invention is powered by a gas product that is separated from liquids having a high dielectric constant, as described in U.S. Pat. No. 4,936,961, herein incorporated by reference in its entirety. Exemplary liquids may include distilled water, filtered tap water, water with or without salt, baking soda and/or added electrolytes. As shown in FIG. 1, hydrogen and oxygen is freed from water molecules by applying an electric charge sufficient to induce electrolysis to a stagnant or flowing body of water positioned between at least two oppositely charged capacitor plates 3. Capacitor plates 3 may be constructed from any electrically conductive and chemically inert material, such as stainless steel T-304, and may form a resonant charging choke circuit with an inductor positioned in series therewith. In operation, capacitor plates 3 may produce a pulsating, unipolar electric field. Water molecules within the electrical field are subjected to a charge having the same polarity as that of the electrical field and become distended by the applied electrical polar forces; further exposure to the pulsating electric field induces resonance within the water molecule. In an exemplary embodiment, the applied electric charge has a voltage of about 120 to about 240 volts. By varying the pulse shape, amplitude, pulse train sequence or combinations thereof of the initial pulsing wave source, final gas output may be varied. Attenuation of the voltage field frequency in the form of OFF and ON pulses likewise affects output. The energy level within the water molecule increases incrementally in proportion with the electrical pulses, and hydrogen and oxygen gases may be released when the resonant energy exceeds the covalent bonds of a water molecule.

In an exemplary embodiment, the environmental conditions and one or more pairs of conductive plates 3 of electrolytic fuel cell 1 may be appropriately arranged to produce Brown's gas. Alternatively, the system may include any conventional apparatus suitable for producing Brown's gas. Exemplary devices for producing Brown's gas are described in U.S. Pat. Nos. 4,014,777; 6,761,558; and 7,459,071, the disclosures of which are herein incorporated by reference in their entirety. Upon combustion, a Brown's gas flame may chemically react with and heat certain materials to a substantially higher temperature than that of the actual temperature of the Brown's gas flame. For example, a 274° F. Brown's gas flame may be used to vaporize tungsten, having a melting point of 6,000° F. Consequently, the Brown's gas flame may be used to generate a substantial amount of energy.

Figure 2:
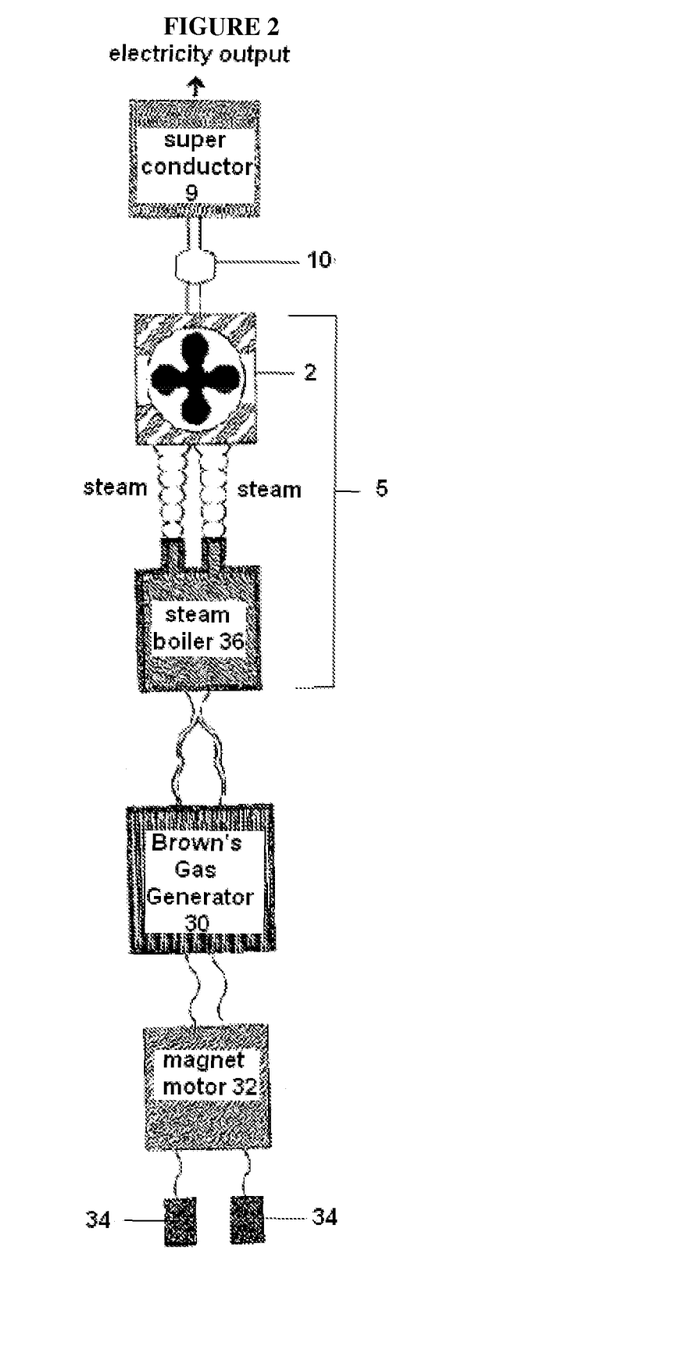
FIG. 2 is a schematic diagram of an exemplary energy conversion system of the present invention.

As shown in the alternative exemplary embodiment of FIG. 2, Brown's gas may be produced by a Brown's gas generator 30 that is powered using a driving motor 32, preferably a magnet motor. Driving motor 32, in turn, may be powered by and started using batteries 34.

The resultant gas products, steam and heat produced by electrolysis process or Brown's gas generator 30 may be collected and transported by one or more conduits to engine 5, which may be any conventional engine suitable for converting the gas products to mechanical energy in order to drive generator 9. In one exemplary embodiment, engine 5 may be an internal combustion engine having a combustion chamber 6 wherein hydrogen gas and other components may be reacted. Engine 5 may be provided with an igniter 8, such as an adaptor sparkplug. As shown in the exemplary embodiment of FIG. 3(*a*)-3(*b*), a gas product, such as hydrogen gas, is fed into the igniter 8 and conducted through a conduit into combustion chamber 6. Within combustion chamber 6, the hydrogen may be mixed with air and pressurized. An igniter 8 may initiate combustion by conducting hydrogen gas towards a spark wire, producing an electric spark and igniting the hydrogen gas prior to pressurization of the gaseous mixture within combustion chamber 6. The energy generated by combustion applies a reciprocating force against pistons 7 and rotates drive shaft 10, which in turn provides the mechanical energy necessary to turn a rotor 12 of generator 9 to produce electricity. In an exemplary embodiment, Brown's gas produced by electrolytic cell 1 may be combusted in engine 5. Because the Brown's gas contains oxygen, no additional mixture of oxygen or air is necessary in order to initiate combustion. The combustion of the Brown's gas may substantially magnify the amount of heat and pressure used to apply a force against pistons 7 and rotates drive shaft 10.

Alternatively, engine 5 may be a steam engine including a boiler 36 and a steam turbine 2 or pistons 7. As shown in the exemplary embodiment of FIG. 2, a boiler 36 may be heated by combusting a gas product generated by electrolysis or Brown's gas generator 30, thereby producing steam for driving a steam turbine 2 or pistons 7. In an exemplary embodiment, the gas product is Brown's gas and upon combustion, forms a Brown's gas flame. As some of the single oxygen molecules of the Brown's gas flame bonds with the metal of boiler 36, the boiler 36 may be heated to a temperature in excess of thousands of degrees Fahrenheit using a Brown's gas flame of about 274° F. Steam generated the heated water within the boiler 36 may then used to drive steam turbine 2 or pistons 7 of the steam engine and consequently rotate drive shaft 10. The steam engine is advantageous because it has fewer moving parts than conventional internal combustion engines, no plugs to fuel and no need for periodic part replacement. Energy conversion system 100 of the present invention may also be adapted to incorporate and use other conventional engines 5 for generating mechanical energy.

Generator 9 may be any generator having any suitable motor 11, such as an electric motor or a magnetic induction motor, for converting the mechanical energy of drive shaft 10 into electricity. Electricity produced by generator 9 may be subsequently stored in a capacitor or battery, directed to a power grid, used to run an electrical device or a combination thereof. At least some of the electricity may also be used to recharge the adaptor and batteries that power electrolysis fuel cell 1. In an exemplary embodiment, generator 9 may be a magnetic induction motor, such as the Vorktek™ magnet motor described in PCT patent application publication no. WO/2009065219, published on May 28, 2009 herein incorporated by reference in its entirety, and may supply power to electrolysis fuel cell 1.

Figure 4:
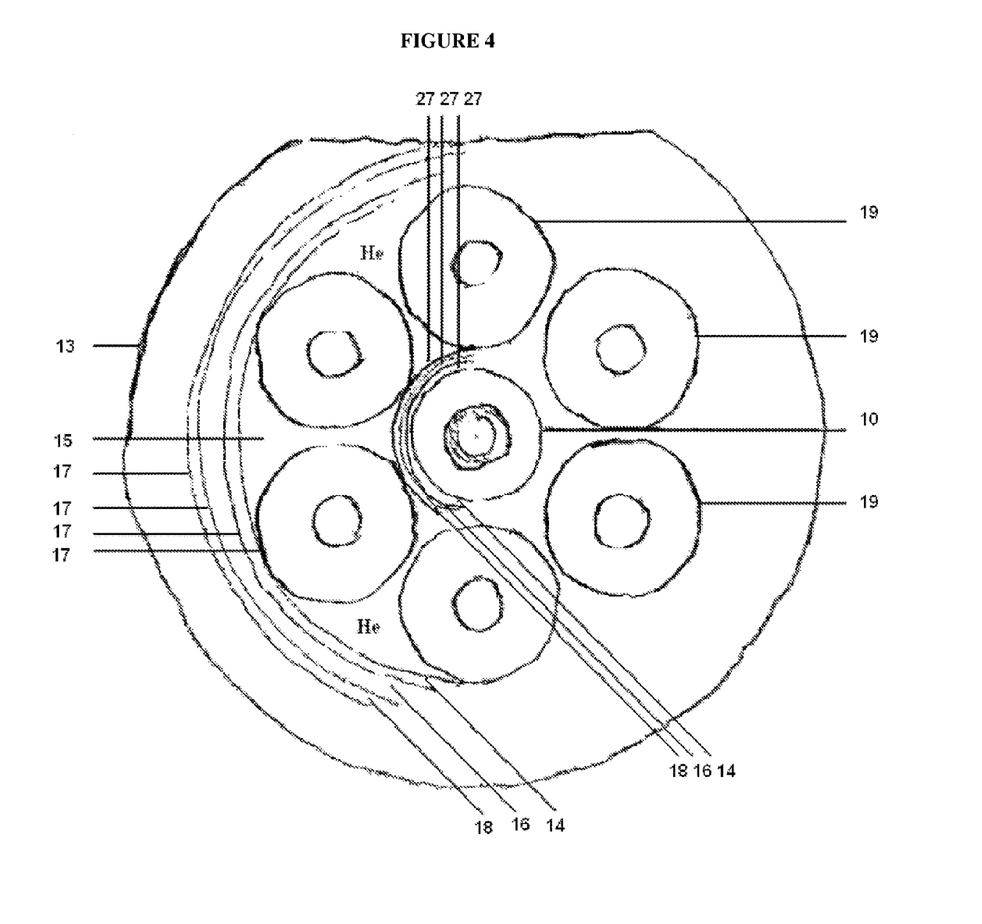
FIG. 4 is a cross-section of the generator's stator assembly showing the magnetic coil elements immersed in liquid helium and encased in a multi-walled container having three insulating layers.
Figure 5A:
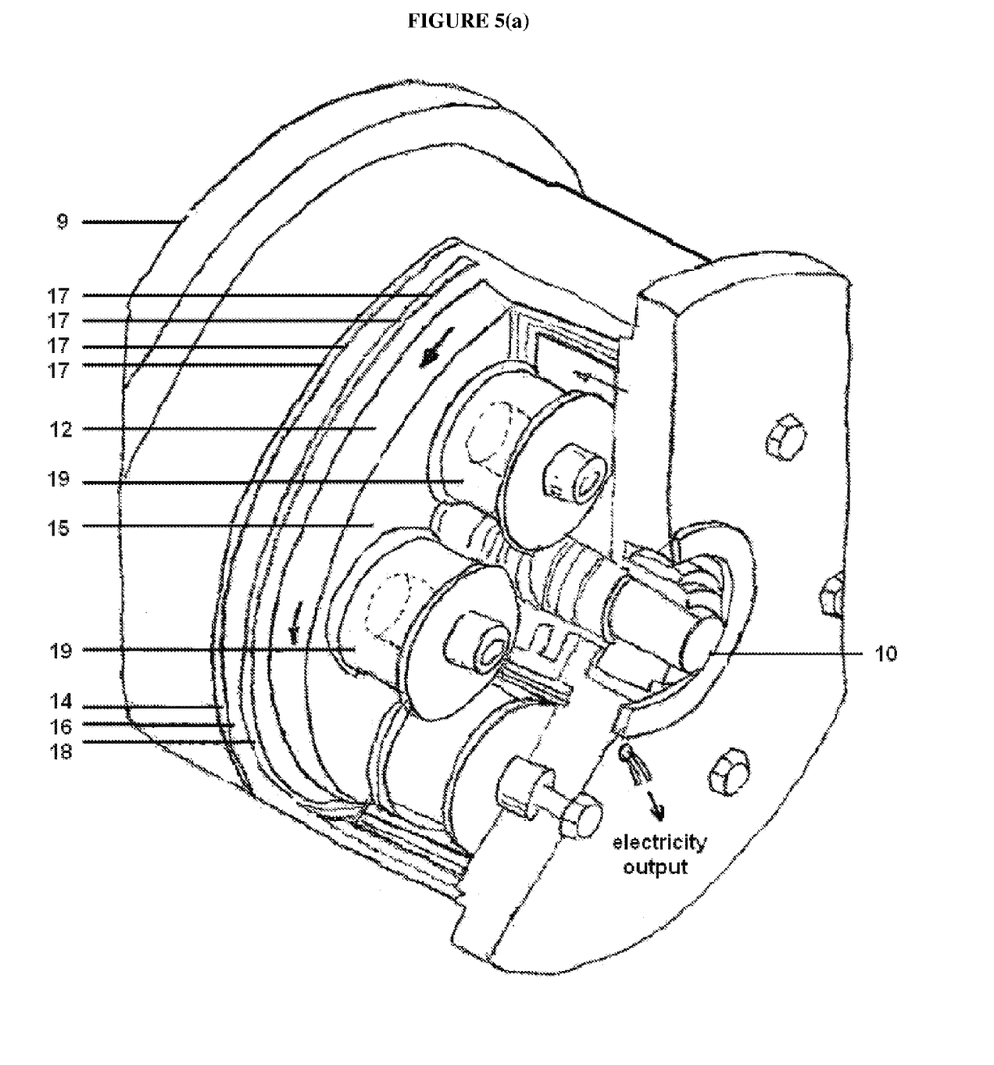
Figure 5B:
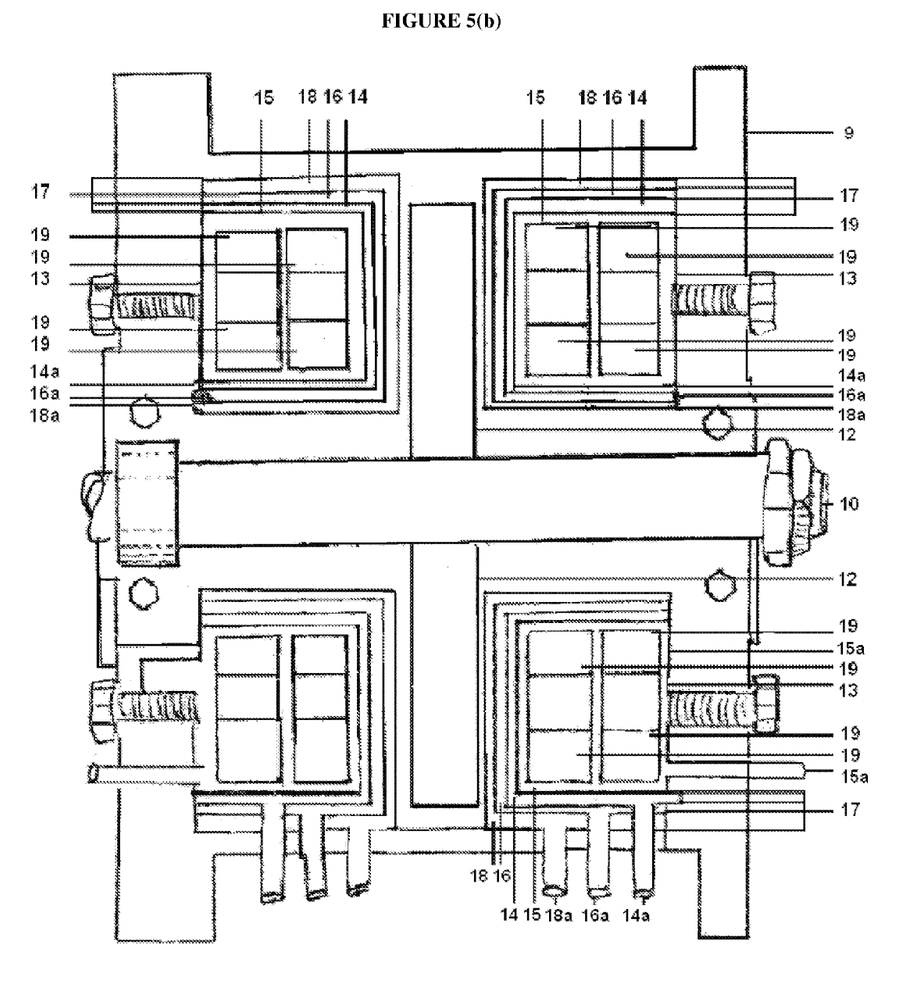
Figure 5C:
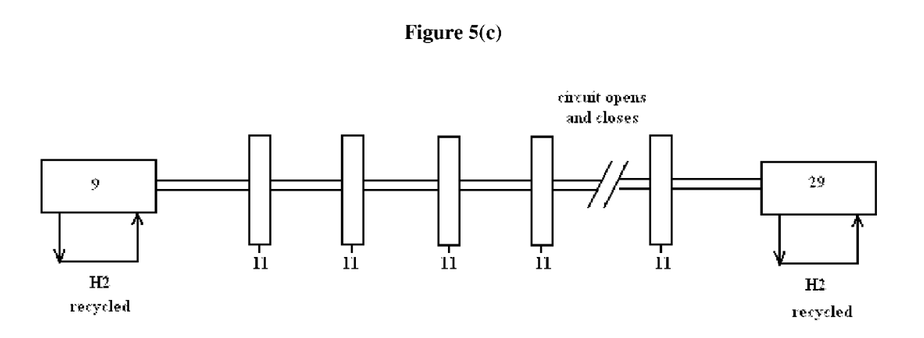

In the exemplary embodiment shown in FIGS. 4-5(*c*), generator 9 may be a superconducting generator having a motor 11 with a magnetic rotor 12 operatively associated with one or more stator assemblies 13. As shown in FIGS. 4-5(*b*), rotor 12 may be constructed as a magnetic or electromagnetic element that is supported by one or more bearings and rotated by drive shaft 10. Stator assembly 13 may be constructed as a non-magnetic chamber 15 having one or more walls 17 that encase a plurality of fixed magnetic or electromagnetic coil elements 19 constructed by winding superconducting wire into flat coils. In an exemplary embodiment, stator assembly 13 may be fabricated from yttrium, barium, copper, oxygen, magnesium bromide or other superconducting materials, such as ceramics, or combinations thereof. To minimize resistance and increase energy output, a cooling agent, such as liquid helium, liquid hydrogen, liquid nitrogen, or combinations thereof may be introduced into non-magnetic chamber 15 via a chamber port 15a. In an exemplary embodiment, magnetic coil elements 19 may be immersed in the cooling agent. As shown in FIGS. 5(a)-5(b), electricity may be derived from changes in the magnetic field induced by magnetic rotor 12 as it spins between the fixed magnetic coil elements 19. The energy produced by engine 5 is preserved by the superconductor generator because little or no energy is lost to resistance in the magnetic coil elements 19. This energy may be stored in one or more capacitor units 30, such as a bank of batteries.

In another exemplary embodiment, energy conversion system 100 may further include a cryogenic freezing system 200 suitable for cooling the stator assembly 13 of the superconducting generator, wherein two or more walls 17 of non-magnetic chamber 15 form one or more insulating layers 14, 16 and 18 that cool the liquid helium medium and magnetic coil elements 19 within non-magnetic chamber 15. As shown in FIGS. 4-5(b), non-magnetic chamber 15 may have four walls 17 that form three insulating layers 14, 16 and 18. Cooling medium 22 may be introduced and circulated through insulating layers 14, 16 and 18 via ports 14a, 16a and 18a. In one exemplary embodiment, first and third insulating layer 14, 18 may be a cooled vacuum space and a second insulating layer 16 which may contain liquid nitrogen can be positioned therebetween. In the alternative embodiment shown in FIGS. 4-5(b), first insulating layer 14 may be filled with liquid helium; a second insulating layer 16 may be maintained as a cold vacuum, and a third insulating layer 18 may be filled with liquid nitrogen. Insulating layers 14, 16 and 18 form a thermal barrier designed to prevent the liquid helium within non-magnetic chamber 15 from warming and reverting to a gaseous state. In an exemplary embodiment, cryogenic freezing system 200 maintains non-magnetic chamber 15 at a temperature that is equal to or below about 17° Kelvin, preferably, equal to or below about the boiling point of helium, more preferably, as close to about 0° Kelvin as possible. The insulating layers and cooled liquid helium within non-magnetic chamber 15 minimizes and/or eliminates resistance in stator assembly 13 and thereby substantially enhances energy conversion efficiency. As shown in FIG. 4, in an exemplary embodiment, drive shaft 10 may also be surrounded by one or more drive shaft walls 27 that form a plurality of insulating layers 14, 16 and 18 and retain one or more cooling mediums 22 for cooling the drive shaft 10.

Optionally, as shown in FIGS. 3(a)-3(b) and 5(c), cryogenic freezing system 200 may have a refrigeration device 20 that transports and circulates a continuous supply of one or more cooling mediums 22. In an exemplary embodiment, refrigeration device 20 may be powered by a second electrolysis fuel cell 21, a second engine 25 and a second generator 29 having the same components and arrangement as that of electrolysis fuel cell 1, engine 5 and generator 9. Generator 29 may be a superconductor generator having the same components and design as discussed above. In addition to powering refrigeration device 20, generator 29 may also electrify the rotor 12 of generator 9 to enhance the magnetic force.

Figure 6A:
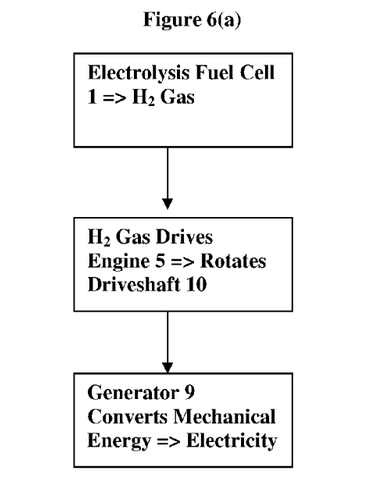
Figure 6B:
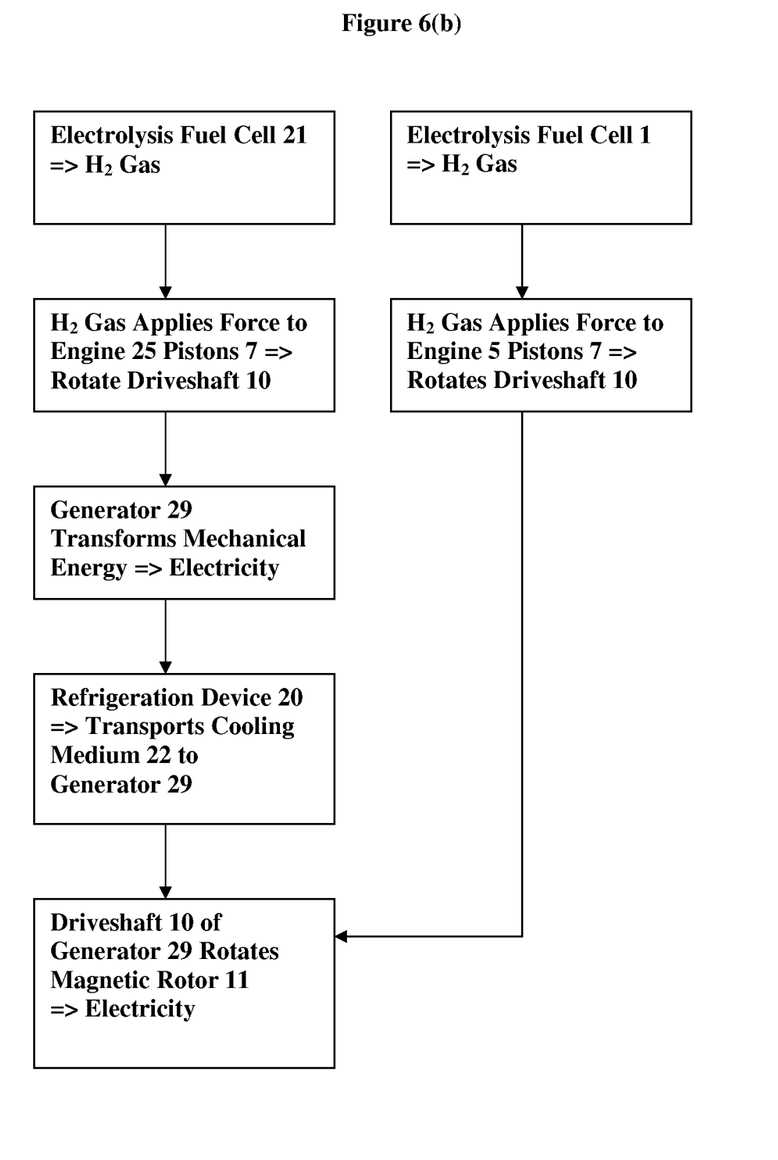

Using the novel energy conversion system 100 of the present invention, it may be possible to efficiently convert energy derived from the gas product derived from electrolysis into electricity. The flow chart of FIG. 6(a) shows an exemplary method of the present invention, wherein engine 5 may convert a gas product produced by electrolysis into mechanical energy, and generator 9 may convert the mechanical energy of engine 5 to electricity. FIG. 6(b) shows an alternative method of the present invention that uses cryogenic freezing system 200 to generate electricity. In an exemplary embodiment, the gas product may be Brown's gas, and the described methods may be capable of efficiently and effectively converting more than about 50% of the energy from the gas product derived from electrolysis into electricity, preferably, more than about 90% the energy from the gas product derived from electrolysis into electricity, more preferably, more than about 95% the energy from the gas product derived from electrolysis into electricity, most preferably about 100% the energy from the gas product derived from electrolysis into electricity. The novel energy conversion system 100 and method of the present invention is therefore highly efficient and is capable of producing clean and renewable energy. It is envisioned that the invention may be useful for a wide variety of applications, including the generation of electricity to power electrical devices such as electric powered vehicles or replace dangerous or environmentally unfriendly means for generating energy, such as nuclear reactors or coal reactors.

The foregoing description of embodiments of the invention has been presented for the purpose of illustration and description only and is not to be construed as limiting the scope of the invention in any way. The scope of the invention is to be determined from the claims appended hereto.

The invention claimed is:

1. An energy conversion system comprising:
   a driving motor;
   a fuel cell, powered by the driving motor, that produces a Brown's gas, said fuel cell comprising two oppositely charged conductive plates that produce a pulsating and unipolar electric field for inducing resonance within a molecule of the suitable material;
   a Brown's gas produced by the fuel cell;
   an engine comprising a drive shaft, wherein said engine is driven by combustion of said Brown's gas; and
   a generator operatively associated with said engine, wherein said generator converts mechanical energy from said drive shaft of said engine to electricity.

2. The system of claim 1, wherein said generator comprises a superconducting material.

3. The system of claim 1, wherein said generator comprises a magnetic rotor and a stator assembly.

4. The system of claim 3, wherein said stator assembly comprises a chamber filled with a cooling agent and housing a magnetic coil element.

5. The system of claim 4, wherein said chamber is maintained at a temperature of about 17°K or less.

6. The system of claim 4, wherein said chamber has a plurality of walls forming a plurality of insulating layers.

7. The system of claim 6, wherein at least one of said insulating layers may be filled with a cooling medium selected from the group consisting of liquid helium, liquid nitrogen and a combination thereof.

8. The system of claim 7, further comprising a refrigeration device capable of circulating said cooling medium and cooling said chamber.

9. The system of claim 8, further comprising:
   a second fuel cell comprising two oppositely charged conductive plates that produces a gas by electrolysis;
   a second engine comprising a second drive shaft; and
   a second generator operatively associated with said second engine, wherein said second generator supplies power to said refrigeration device.

10. The system of claim 1, wherein the driving motor, is a magnet motor.

11. The system of claim 10, wherein the magnet motor is powered by batteries.

12. A method for converting energy comprising the steps of:
   a) providing an energy conversion system comprising:
   a driving motor;
   a fuel cell, powered by the driving motor, wherein the fuel cell comprises two oppositely charged conductive plates;
   an engine comprising a drive shaft; and
   a generator operatively associated with said engine;
   b) applying an electric charge to a dielectric medium positioned between said conductive plates to generate a pulsating and unipolar electric field between said conductive plates for inducing resonance within a molecule of a suitable material, and generate a Brown's gas;
   c) combusting said Brown's gas in said engine to generate energy used to apply a force to and induce movement of said drive shaft; and
   d) converting mechanical energy of said drive shaft of said engine to electricity by using said generator.

13. The method of claim 12, further comprising the step of combusting a mixture of oxygen and said gas to induce movement of said drive shaft.

14. The method of claim 12, wherein combusting said Brown's gas is employed to produce steam that is used to induce movement of said drive shaft.

15. The method of claim 12, wherein at least some of said generated electricity is employed to power said conductive plates.

16. The method of claim 12, wherein said suitable material comprising water.

17. The method of claim 12, wherein said generator comprises a magnetic rotor and a stator assembly comprising a magnetic coil element, wherein said generator converts mechanical energy to electricity by rotating said magnetic rotor adjacent to said magnetic coil element.

18. The method of claim 17, wherein said stator assembly further comprises a chamber filled with a cooling agent and wherein said magnetic coil element are immersed in said cooling agent.

19. The method of claim 18, wherein said chamber comprises two walls and wherein said method further comprising the step of circulating a cooling medium through said walls.

20. The method of claim 19, wherein said cooling medium is selected from the group consisting of liquid helium, liquid nitrogen, liquid hydrogen and a combination thereof.

* * * * *